US009103366B2

(12) United States Patent
Amikura et al.

(10) Patent No.: US 9,103,366 B2
(45) Date of Patent: Aug. 11, 2015

(54) BOLT-LOCKING APPARATUS, MOUNTING METHOD THEREOF AND MOUNTING JIG

(75) Inventors: Norihiko Amikura, Kurokawa-gun (JP); Satoshi Kagatsume, Nirasaki (JP); Masahiko Satoh, Nirasaki (JP); Yukio Naito, Kurokawa-gun (JP); Satoshi Muto, Kurokawa-gun (JP); Tomohiro Nakata, Osaka (JP); Tsutomu Shinohara, Osaka (JP); Michio Yamaji, Osaka (JP)

(73) Assignees: TOKYO ELECTRON LIMITED, Tokyo (JP); FUJIKIN INCORPORATED, Osaka-shi (JP)

( * ) Notice: Subject to any disclaimer, the term of this patent is extended or adjusted under 35 U.S.C. 154(b) by 528 days.

(21) Appl. No.: 13/413,821

(22) Filed: Mar. 7, 2012

(65) Prior Publication Data
US 2012/0230757 A1  Sep. 13, 2012

(30) Foreign Application Priority Data

Mar. 11, 2011  (JP) .................................. 2011-053966

(51) Int. Cl.
*F16K 27/00*   (2006.01)
*F16B 39/10*   (2006.01)

(52) U.S. Cl.
CPC ............. *F16B 39/103* (2013.01); *F16B 39/101* (2013.01); *Y10T 29/49826* (2015.01); *Y10T 29/53* (2015.01); *Y10T 403/50* (2015.01)

(58) Field of Classification Search
CPC ..................................................... F16B 39/101
USPC ............ 137/884; 411/87, 88, 90, 92, 96, 102, 411/119, 966
See application file for complete search history.

(56) References Cited

U.S. PATENT DOCUMENTS

| 756,423 | A | * | 4/1904 | Smith ............................. 411/94 |
| 1,136,234 | A | * | 4/1915 | Johnson et al. .................. 411/91 |
| 2,385,777 | A | * | 10/1945 | Ebert ............................... 411/84 |
| 2,620,008 | A | * | 12/1952 | Mallard .......................... 411/87 |
| 2,758,628 | A | * | 8/1956 | Rice ............................... 411/87 |
| 3,467,417 | A | * | 9/1969 | Whiteside et al. .......... 403/408.1 |
| 4,346,734 | A | * | 8/1982 | Frank ............................. 137/506 |
| 4,657,457 | A | * | 4/1987 | Rickwood ....................... 411/93 |
| 4,893,975 | A | * | 1/1990 | Anthony .......................... 411/87 |
| 5,624,218 | A | * | 4/1997 | Dauwalter ....................... 411/87 |

FOREIGN PATENT DOCUMENTS

| DE | 3213733 A1 | 10/1983 |
| GB | 2408783 A | 8/2005 |

(Continued)

OTHER PUBLICATIONS

JP Office Action in corresponding Japanese patent application No. 2011-53966.

*Primary Examiner* — John Fox
(74) *Attorney, Agent, or Firm* — Oblon, McClelland, Maier & Neustadt, L.L.P.

(57) ABSTRACT

A bolt-locking apparatus includes a plurality of fitting members 2 and 3 which are relatively non-rotatably fitted to heads of a plurality of bolts 5, and an engaging member 4 fitted to the plurality of fitting members 2 and 3 such that the engaging member 4 straddles the fitting members 2 and 3. Outer peripheral surfaces 2b and 3b of the fitting members 2 and 3 are non-circular in shape. The engaging member 4 includes a plurality of engaging holes (non-circular engaging portions) 8a and 8b which correspond to the non-circular outer peripheral surfaces 2b and 3b of the plurality of fitting members 2 and 3.

7 Claims, 13 Drawing Sheets

(56) References Cited

FOREIGN PATENT DOCUMENTS

| JP | 61-61316 | 4/1986 |
| JP | 4238453 B2 | 9/2001 |
| JP | 3615738 B2 | 10/2002 |
| JP | 2007-107701 A | 4/2007 |

* cited by examiner

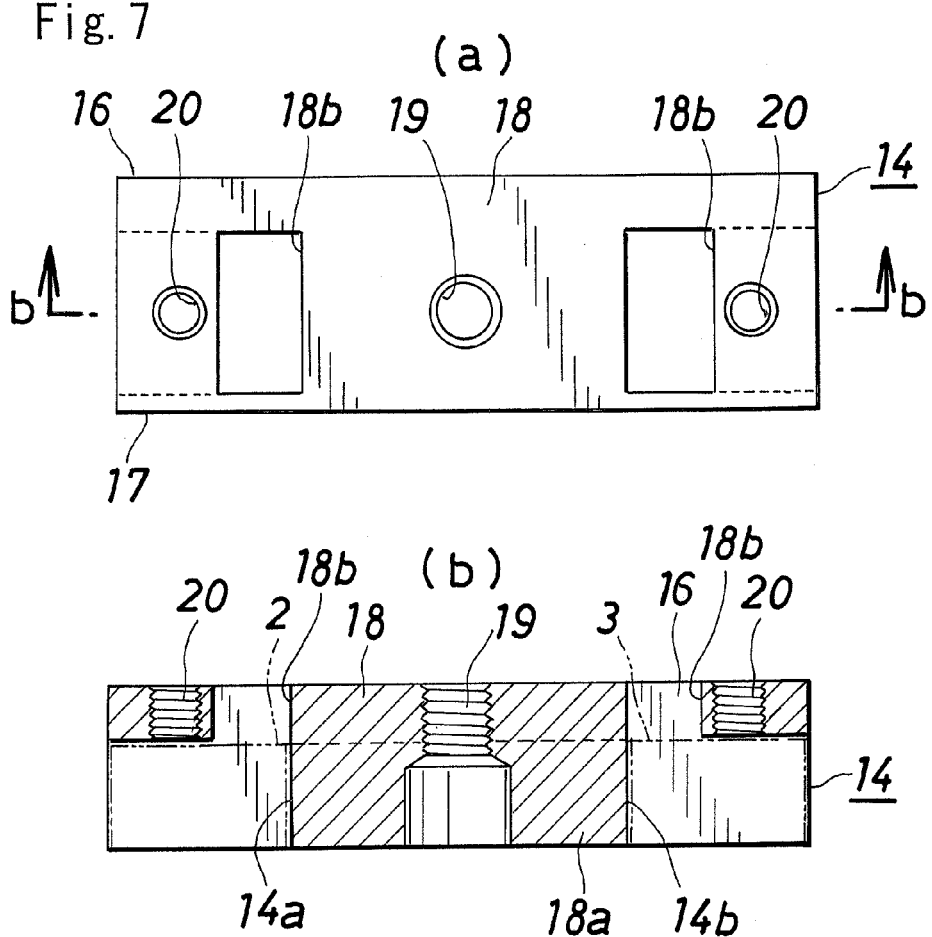
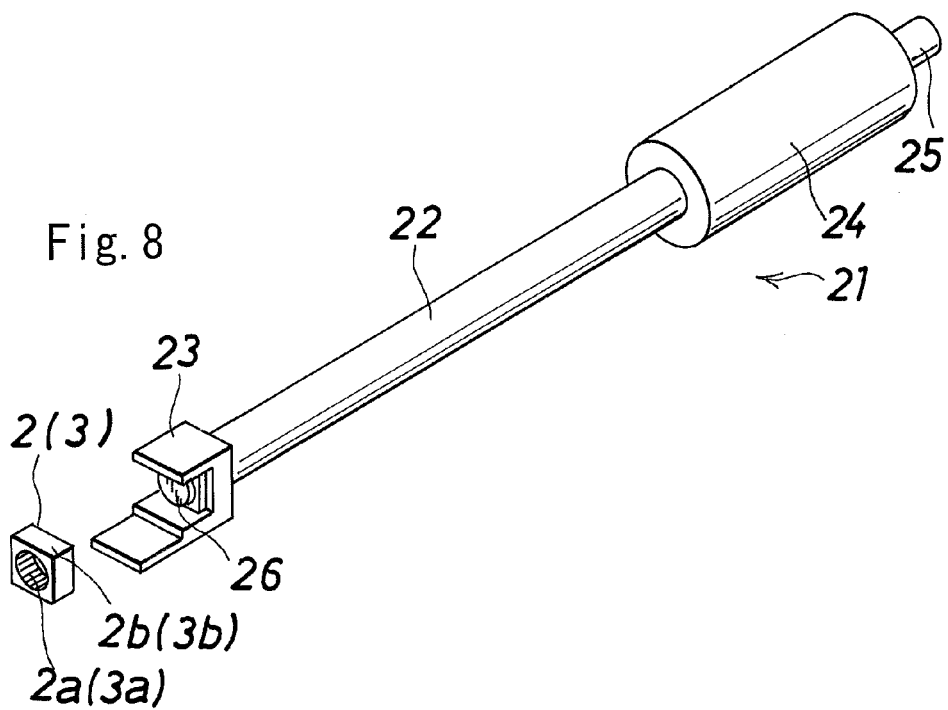

BOLT-LOCKING APPARATUS, MOUNTING METHOD THEREOF AND MOUNTING JIG

BACKGROUND OF THE INVENTION

The present invention relates to a bolt-locking apparatus after a member to be fixed (to-be fixed member, hereinafter) is fixed using a plurality of bolts, a mounting method for mounting the bolt-locking apparatus, and a mounting jig used in the mounting method.

It is well known that a bolt which is once appropriately fastened is loosened due to influence of vibration or the like, and various bolt-locking apparatuses or locking members are proposed to prevent this.

For example, Japanese Patent Publication No. 3615738 discloses a bolt-locking member used when a member is mounted using a pair of bolts, this bolt-locking member including a plate-shaped body, a first fitting portion which is integrally provided on the body and which is relatively non-rotatably fitted to a head of one of the bolts, and a second fitting portion which is integrally provided on the body and which is relatively non-rotatably fitted to a head of the other bolt.

Japanese Patent Publication No. 4238453 discloses a fluid control apparatus including a plurality of upper members (fluid control devices having passage blocks) and a plurality of lower members (block joints). This fluid control apparatus is also called integration fluid control apparatus, and fixes a passage block to the lower member using a bolt. In such an integration fluid control apparatus, it is necessary to prevent a bolt from loosening to maintain sealing performance. However, since there is no sufficient space around the bolt, a bolt-locking apparatus which can be disposed in a narrow space and a mounting method of the apparatus are desired.

The bolt-locking member of Japanese Patent Publication No. 3615738 has a merit that loosening can be prevented using one member, but there is a problem that a structure of the member is complicated and it is difficult to manufacture the member. There is also a problem that in a state where the first fitting portion is fitted to the one bolt, a mounting operation for fitting the second fitting portion to the other bolt is difficult. Therefore, it is difficult to apply the bolt-locking member of Japanese Patent Publication No. 3615738 to the fluid control apparatus of Japanese Patent Publication No. 4238453.

SUMMARY OF THE INVENTION

It is an object of the invention to provide a bolt-locking apparatus in which a structure of a bolt-locking member is simplified and a mounting operation can easily be carried out, and to provide a mounting method of the bolt-locking apparatus and a mounting jig.

The bolt-locking apparatus is a bolt-locking apparatus after a to-be fixed member is fixed using a plurality of bolts, including a plurality of fitting members which are relatively non-rotatably fitted to heads of the plurality of bolts, and an engaging member which is mounted on the plurality of fitting members such that the engaging member straddles the fitting members, the engaging member being engaged with the fitting members.

The bolts used in the invention may be a hexagonal-head bolt, a square-head bolt, a hexagonal socket-head bolt conforming to JIS, and also may be a special shaped-head bolt having a non-circular head. In the case of the hexagonal socket-head bolt conforming to JIS, a straight knurled-head bolt is preferable.

A fitting member, for example, has a plate-shape, an inner peripheral surface thereof has a shape corresponding to an outer peripheral shape of a bolt (hexagonal shape in the case of a hexagonal-head bolt), and an outer peripheral surface of the fitting member has an appropriate non-circular shape (e.g., hexagonal shape or square shape). In the case of a straight knurled hexagonal socket-head bolt, an inner peripheral surface of the fitting member is knurled. In the case of a fitting member for a hexagonal socket-head bolt, a hexagonal column convex portion which is fitted into a hexagonal hole may be provided on a central portion of a square plate-shaped member. An engaging member is formed into a plate-shape or a frame-shape, and an engaging portion is provided on the engaging member. The engaging portion engages with at least a portion of a non-circular outer peripheral surface of each of fitting members to prevent the fitting members from moving. The engaging portion has a shape corresponding to the non-circular outer peripheral surface of the fitting member (if the fitting member has a hexagonal shape, the engaging portion is also formed into hexagonal shape). An outer shape of the engaging member is a square shape or a circular shape and preferably, a shape corresponding to a shape of a portion on which a bolt is mounted. It is preferable that the outer shape of the engaging member is a shape which is prevented from rotating by a member on which a bolt is mounted.

Here, the "non-circular shape" of the outer peripheral surface of the fitting member and each of the engaging portions of the engaging member are shapes other than a perfect circular shape, and the non-circular shape means such a shape that when the engaging member is mounted on the fitting member and the fitting member and the engaging member are fitted to each other, the fitting member and the engaging member can not relatively rotate. However, it is unnecessary that the fitting member and the engaging member are relatively non-rotatably fitted to each other in a first fitting state unlike tight fitting (press fitting), and it is only necessary that when they relatively rotate, a portion of an outer peripheral surface of the fitting member and a portion of the engaging portion of the engaging member engage with each other. This is because that even if the fitting member and the engaging member can not completely rotate in a state where they are fitted to each other, if they are slightly loosened and a rotation-preventing function is exerted, since the fitting member can not rotate thereafter, a loosening-preventing function is exerted. In short, it is only necessary that the engaging member can prevent the fitting member from rotating (moving), and a shape of the engaging member is appropriately changed in accordance with a shape of the fitting member.

In addition to the hexagonal shape and the square shape, the non-circular outer peripheral surface of the fitting member and the non-circular inner peripheral surface of the engaging portion of the engaging member may employ such a shape that one or more projections or notches are provided on or in a circular outer peripheral surface. Each of the fitting members may have such a shape that a through hole is provided in a synthetic resin raw material, and the fitting member can easily be manufactured.

The fitting member and a bolt head are relatively non-rotatably fitted to each other (play is substantially zero), rotation of the fitting member is prevented, thereby preventing the bolt from rotating (loosening). Since the fitting members may be fitted to bolts individually, it is possible to carry out the fitting operation easily. If the engaging member is made of synthetic resin, it can resiliently deform. According to this, the engaging member can easily be fitted to a plurality of fitting members such that the engaging member straddles the fitting members.

The engaging member and the fitting member are relatively non-rotatably fitted to each other, but there may be slight play. When there is play, the fitting member can rotate by an amount of the play correspondingly. According to this, the bolt can also rotate, but since the bolt is not loosened more than play, a loosening amount can be suppressed to a predetermined value or less (substantially zero). The play may substantially be zero of course, but by providing a certain level of play, the engaging member and the fitting member can be fitted to each other more easily.

The plurality of fitting members usually have the same shapes, but the invention is not limited to this. When all of the fitting members have the same shapes, a first engaging portion and a second engaging portion may have the same shapes, but the invention is not limited to this, and the second engaging portion may be formed larger so that the second engaging portion is provided with the play. It is preferable that the first engaging portion and the second engaging portion are partitioned from each other, but the partition may be eliminated and engaging portions may be formed into one engaging portion including all of the fitting members.

It is preferable that the engaging member includes a first opposed wall which is opposed to outer peripheral surfaces of the plurality of fitting members from one side, a second opposed wall which is opposed to the outer peripheral surfaces of the plurality of fitting members from the other side, and a connection wall which connects both the opposed walls to each other. According to this, a shape of the engaging member which is mounted such that the engaging member straddles the plurality of fitting members can be simplified and it becomes easy to secure strength of the engaging member.

Each of the engaging portions of the engaging member has a non-circular inner peripheral surface which corresponds to the non-circular outer peripheral surface of each of the fitting members, and the engaging portion is an engaging hole provided in the connection wall in some cases.

The connection wall of the engaging member includes a projection which is fitted in between adjacent fitting members and forms the engaging portion with the first opposed wall and the second opposed wall in some cases.

A fastening structure (fixing structure) to which the bolt-locking apparatus of the invention is applied is not limited, but the bolt-locking apparatus is applied to a fixing structure of a passage block of a fluid control apparatus. This passage block requires a sealing portion. Therefore, when a bolt is loosened, sealing performance is deteriorated and it is extremely important to prevent the bolt from loosening.

When the invention is applied to the fixing structure of the passage block of the fluid control apparatus, each of the bolts is a hexagonal socket-head bolt whose head peripheral surface is straightly knurled, the head of each of the hexagonal socket-head bolts projects from a to-be fixed member (passage block) and penetrates the to-be fixed member, an outer peripheral surface of each of the fitting members is square in shape, an inner peripheral surface of the fitting member is knurled, the fitting member is fitted to the head of each of the hexagonal socket-head bolts which is exposed from the to-be fixed member, the engaging member is fitted to the plurality of fitting members such that the engaging member straddles the fitting members, and the engaging member is received by the to-be fixed member.

The passage block is a rectangular prism body, a fluid passage having an appropriate shape is formed and with this, a sealing portion is provided. When the passage block is mounted, a plurality of bolts are disposed to surround the sealing portion, the sealing performance is secured, and the passage block is mounted on a support member. The passage block is handled as one member in some cases. If the passage block is integrally mounted on an actuator, the passage block is used as a passage forming portion of a valve in some cases.

The number of the plurality of bolts is two (a pair), but the number may exceeds two. At that time, the plurality of bolts need not be arranged straightly, and the engaging member may be deformed in accordance with positions of the bolts.

It is preferable that the bolt-locking apparatus uses an appropriate mounting jig (first mounting jig for mounting the fitting member, and second mounting jig for mounting the engaging member).

According to a mounting method of the bolt-locking apparatus of a first invention, a first mounting jig having a holding portion which holds the outer peripheral surface of the fitting member and a pushing portion which abuts against the fitting member and which can move with respect to the holding portion is used, the fitting member is mounted on the bolt in a state where the fitting member is held by the holding portion of the first mounting jig and then, the pushing portion of the first mounting jig is moved, thereby detaching the fitting member from the holding portion of the first mounting jig.

According to the mounting method of the bolt-locking apparatus of the first invention, as a space when the fitting member is mounted, even if there are no sufficient spaces around the bolt (front, back, left and right sides) although there is a space above the bolt, it is possible to reliably fit the fitting member to the bolts.

According to a mounting method of the bolt-locking apparatus of a second invention, a screw hole is provided in the engaging member, a second mounting jig having a male thread which is threadedly engaged with the screw hole of the engaging member is used, the second mounting jig is pressed such that the second mounting jig straddles the plurality of fitting members in a state where the engaging member is threadedly engaged with the second mounting jig, thereby mounting the engaging member on the plurality of fitting members.

According to the mounting method of the bolt-locking apparatus of the second invention, as a space when the fitting member is mounted, even if there are no sufficient spaces around the bolts and the fitting members (front, back, left and right sides) although there are spaces above the bolt and the fitting member, it is possible to reliably fit the engaging member to the fitting member.

The first mounting jig of the invention includes a hollow shaft which is integrally provided at its tip end with a holding portion for holding the outer peripheral surface of the fitting member, a grip provided on a base end of the hollow shaft, and an inner shaft that is integrally provided at its tip end with a pushing portion which abuts against the fitting member, the inner shaft being inserted into the hollow shaft such that the inner shaft can move in an axial direction, and a base end of the inner shaft projecting from the hollow shaft.

According to the first mounting jig of the invention, it is possible to solve the problem that the fitting member can not easily be detached from the first mounting jig after the fitting member is fitted to the bolt.

The second mounting jig of the first invention includes a shaft body provided at its tip end with a male thread which is threadedly engaged with a screw hole provided in the engaging member, and a reinforcing plate which abuts against the engaging member, wherein the shaft body is relatively rotatably mounted on the reinforcing plate.

According to the second mounting jig of the first invention, a warp of the engaging member can be straightened by the reinforcing plate. Therefore, the fitting operation when the engaging member is mounted on the plurality of fitting members can be carried out smoothly.

The second mounting jig of the second invention includes a shaft body having a reinforcing plate and an auxiliary shaft body which is detachably mounted on the shaft body having the reinforcing plate, wherein the shaft body having the reinforcing plate includes a main shaft body provided at its tip end with a male thread which is threadedly engaged with a screw hole provided in one end of the engaging member, and a reinforcing plate which abuts against the engaging member, the main shaft body is relatively rotatably mounted on the reinforcing plate, a through hole into which the main shaft body is inserted is provided in one end of the reinforcing plate, and a screw hole is provided in the other end of the reinforcing plate, and the auxiliary shaft body is provided at its tip end with a male thread which is threadedly engaged with the screw hole of the reinforcing plate.

According to the second mounting jig of the second invention, when a portion which hinders insertion of the second mounting jig of the first invention exists above the to-be fixed member, if the second mounting jig of the second invention is used, it is possible to mount the engaging member while avoiding interference.

The fluid control apparatus of the invention includes a fluid control device having passage blocks as a plurality of upper members, and block joints as a plurality of lower members, in which the passage blocks are fixed to the lower members using bolts, wherein the fluid control apparatus includes any one of the bolt-locking apparatuses as a bolt-locking apparatus which prevents the bolt from loosening.

In the fluid control apparatus including the fluid control device having the passage blocks as the plurality of upper members and the block joints as the plurality of lower members, it is necessary to prevent loosening of bolts to maintain the sealing performance. However, since there are no sufficient spaces around the bolt, it is required that a bolt-locking apparatus can be installed in a narrow space. If the fluid control apparatus is provided with the bolt-locking apparatus, it is possible to solve this problem.

Preferably, In a substrate processing apparatus including a processing container in which a substrate to be processed is accommodated, and a processed gas supply portion which supplies processed gas into the processing container, the fluid control apparatus is suitably used as a fluid control apparatus provided in the processed gas supply portion.

The bolt-locking apparatus of the invention includes the plurality of fitting members which are relatively non-rotatably fitted to the heads of the plurality of bolts, and the engaging member which is mounted on the plurality of fitting members such that the engaging member straddles the fitting members, the engaging member being engaged with the fitting member. Therefore, the engaging member prevents the fitting members from rotating in a state where the fitting members can not rotate relative to the bolt and therefore, it is possible to reliably prevent the bolt from loosening.

The inner peripheral surface of the fitting member has a shape corresponding to the outer peripheral surface shape of the bolt, the outer peripheral surface of the fitting member has an appropriate non-circular shape, and the engaging member is provided with the engaging portions which correspond to the plurality of fitting members. Therefore, the fitting member can have a shape in which a plate-shaped raw material is provided with a through hole, and it is possible to easily manufacture the fitting member. Since it is only necessary that the fitting members are individually fitted to the bolts, the fitting operation is easy, and it is possible to easily fit the engaging member to the fitting members such that the engaging member straddles the fitting members by resiliently deforming the engaging member.

According to the mounting method of the bolt-locking apparatus of the invention, as a space when the fitting member and the engaging member are mounted, even if there are no sufficient spaces around the bolt (front, back, left and right sides) although there are spaces above the bolt, it is possible to reliably fit the fitting member and the engaging member to the bolt and the fitting member.

According to the mounting jig of the bolt-locking apparatus of the invention, if the mounting jig is used, it is possible to smoothly carry out the mounting method of the bolt-locking apparatus.

BRIEF DESCRIPTION OF THE DRAWINGS

FIG. 7 shows an engaging member of the bolt-locking apparatus of the invention, wherein FIG. 7(a) is a plan view and FIG. 7(b) is a sectional view taken along the line b-b in FIG. 7(a);

FIG. 8 is a perspective view showing a first mounting jig of the invention;

DETAILED DESCRIPTION OF THE PREFERRED EMBODIMENTS

Embodiments of the invention will be described with reference to the drawings. In the following description, upward and downward directions are based on FIG. 18, a rightward direction in FIG. 18 is a frontward direction, a leftward direction in FIG. 18 is a backward direction, a frontward direction in FIG. 18 is a leftward direction, and a backward direction in FIG. 18 is a rightward direction.

Figure 18:
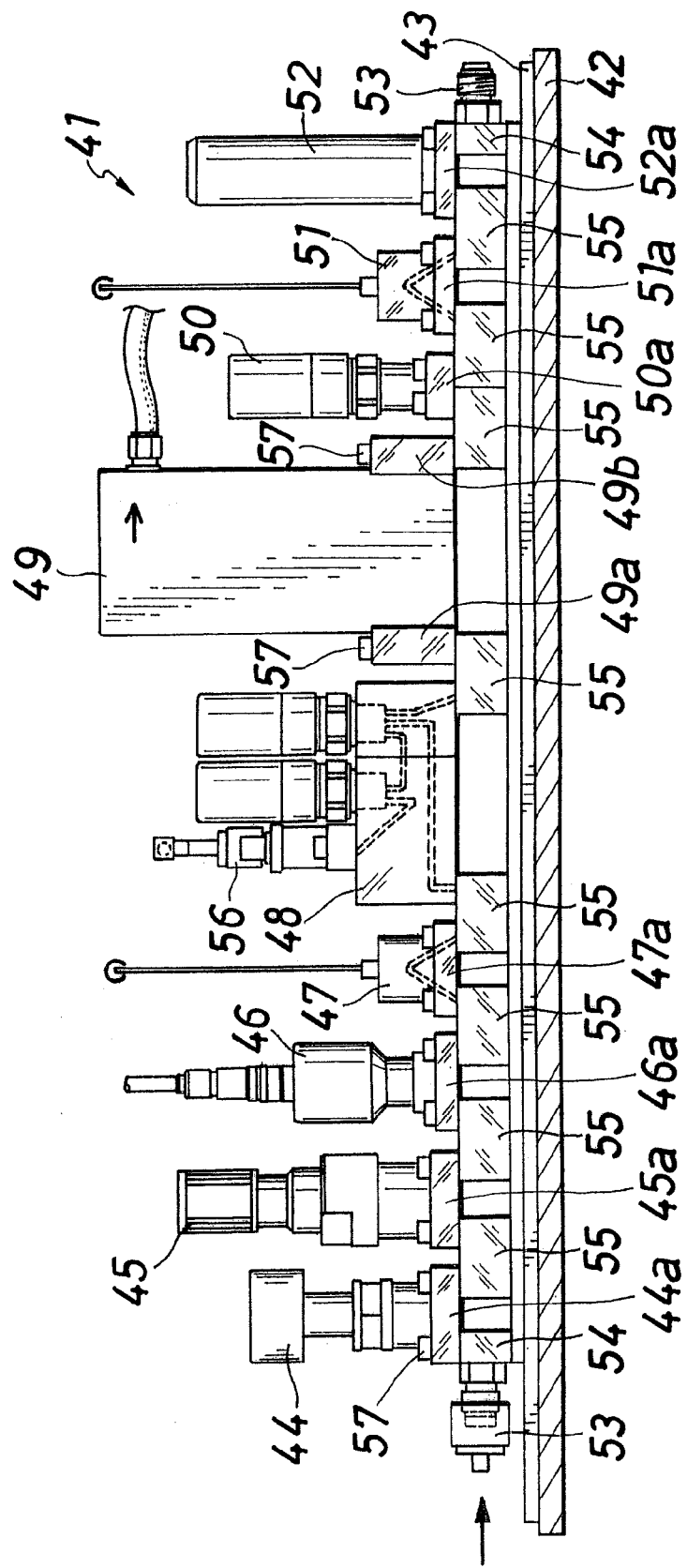
FIG. 18 is a side view of an integration fluid control apparatus as one example of an apparatus for which the bolt-locking apparatus of the invention is used.

FIG. 18 shows an integration fluid control apparatus as one example of an apparatus for which the bolt-locking apparatus of the invention is used. One line (41) of the fluid control apparatus includes a plurality of upper members and a plurality of lower members. An on-off valve (manual) (44), a pressure regulator (45), a pressure sensor (46), a reversed V-shaped passage block (47), an interrupter switch (48), a mass flow controller (49), an on-off valve (automatic) (50), a reversed V-shaped passage block (51), and a filter (52) are disposed as the upper members. L-shaped passage block joints (54) having pipe joints (53), and V-shaped passage block joints (55) which bring adjacent upper members into communication with each other are disposed on both ends as the lower members. The various joint members (e.g., block joints (54) and (55)) as the lower members are placed on one thin and long auxiliary substrate (43), various fluid control devices (44), (45), (46), (47), (48), (49), (50), (51) and (52) as the upper members are mounted such that the fluid control devices straddle the lower members (block joints) (54) and (55), thereby forming the one line (41). A plurality of lines having configurations similar to the line (41) are disposed on a main substrate (42) in parallel, and interrupter switches (48) of the lines (41) are connected to each other through passage connecting means (56), thereby forming the integration fluid control apparatus.

In the fluid control apparatus, passage blocks (49a) and (49b) are disposed on both sides of the mass flow controller (49). The passage blocks (49a) and (49b) are fixed to the lower V-shaped passage block joints (55) through a pair of bolts (57). The on-off valve (manual) (44), the pressure regulator (45), the pressure sensor (46), the reversed V-shaped passage block (47), the on-off valve (automatic) (50), the reversed V-shaped passage block (51) and the filter (52) which are the upper members respectively include passage blocks (44a), (45a), (46a), (47a), (50a), (51a) and (52a). The passage blocks (44a), (45a), (46a), (47a), (50a), (51a) and (52a) are fixed to the lower block joints (54) and (55) through one or two pairs of bolts (57).

Through holes into which the bolts (57) are inserted are provided in the passage blocks (44a), (45a), (46a), (47a), (50a), (51a) and (52a). Heads of the bolts (57) project from upper surfaces of the passage blocks (44a), (45a), (46a), (47a), (50a), (51a) and (52a), and tip ends of the bolts are threadedly engaged with screws provided in the block joints (54) and (55).

A first embodiment of the bolt-locking apparatus (1) of the invention is applied to a fixing structure of the passage blocks (44a), (45a), (46a) (47a), (50a), (51a) and (52a). As shown in FIGS. 1 to 4, the bolt-locking apparatus (1) is suitable for locking the pair of bolts (5) which fix the passage block (to-be fixed member) (11) to a support member (12). The bolt-locking apparatus includes a pair of left and right fitting members (2) and (3) which are relatively non-rotatably fitted to heads of the bolts (5), and an engaging member (4) which is fitted such that the engaging member (4) straddles the pair of fitting members (2) and (3).

The bolts (5) are commercial items (JIS items) having the same shapes, and are hexagonal socket-head bolts, and entire peripheral surfaces (5a) of the heads of the bolts are straightly knurled (a plurality of convex grooves and concave grooves extending in parallel to an axial direction).

The fitting members (2) and (3) have plate-shaped bodies, and through fitting holes (2a) and (3a) are formed in the plate-shaped bodies, outer peripheral surfaces (2b) and (3b) of the fitting members (2) and (3) are square in shape (one example of non-circular shape). Inner peripheral surfaces of the fitting holes (2a) and (3a) are knurled in correspondence with the knurled shape of the head peripheral surface (5a) of the bolt (5) (a plurality of convex grooves and concave grooves extending in parallel to the axial direction). According to this, the fitting holes (2a) and (3a) of the fitting members (2) and (3) are fitted to the knurled shapes of the head peripheral surfaces (5a) of the bolts (5).

The engaging member (4) includes a first opposed wall (6) which is opposed to the outer peripheral surfaces of the pair of left and right fitting members (2) and (3) from their front sides (one sides), a second opposed wall (7) which is opposed to the outer peripheral surfaces of the pair of fitting members (2) and (3) from their rear sides (other sides), and a connection wall (8) which connects both the opposed walls (6) and (7) with each other. Left (first) and right (second) engaging holes (8a) and (8b) which can respectively be fitted to the fitting members (2) and (3) are formed in the connection wall (8). An inner peripheral surface of the left engaging hole (8a) is formed into a square shape which corresponds to the square outer peripheral surface (2b) of the left fitting member (2), an inner peripheral surface of the right engaging hole (8b) is formed into a square shape which corresponds to the square outer peripheral surface (3b) of the right fitting member (3), and they form the engaging holes (8a) and (8b) as engaging portions which engage with at least a portion of the non-circular outer peripheral surfaces of the fitting members (2) and (3) to prevent the fitting members (2) and (3) from moving. The left and right engaging holes (8a) and (8b) are partitioned by a partition (8c). In a state where the engaging member (4) is fitted to the fitting members (2) and (3), an upper surface of the engaging member (4) is slightly higher than upper surfaces of the fitting members (2) and (3).

According to the bolt-locking apparatus (1), in a state where the fitting members (2) and (3) can not rotate relatively to the bolts (5), the engaging member (4) prevents the fitting members (2) and (3) from rotating and therefore, it is possible to reliably prevent the bolts (5) from loosening.

It is only necessary that the inner peripheral surfaces of the fitting members (2) and (3) have shapes corresponding to the outer peripheral surfaces of the bolts (5), the outer peripheral surfaces thereof have appropriate non-circular shapes, and the engaging member (4) is provided with the engaging holes (8a) and (8b) which correspond to the fitting members (2) and (3). Hence, the fitting members (2), (3) and (4) can be formed from synthetic resin plate bodies having through holes, and they can easily be manufactured.

Since the fitting members (2) and (3) can individually be fitted to the bolts (5), the fitting operation is easy. The engaging member (4) is formed into the synthetic resin plate body for example, it can resiliently be deformed, and the engaging member (4) can easily be fitted to the fitting members (2) and (3).

Figure 1:
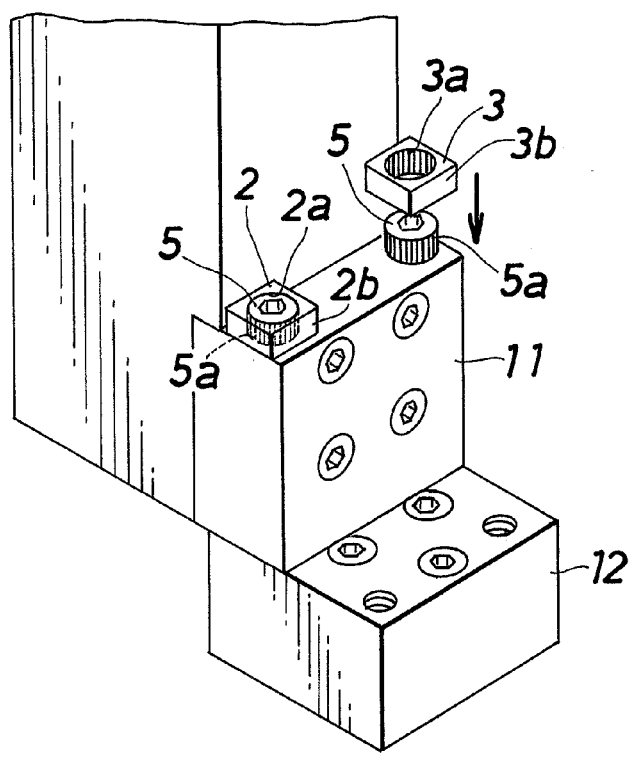
FIG. 1 is a perspective view showing a first embodiment of a bolt-locking apparatus according to the present invention and showing a first state when the bolt-locking apparatus is mounted.
Figure 2:
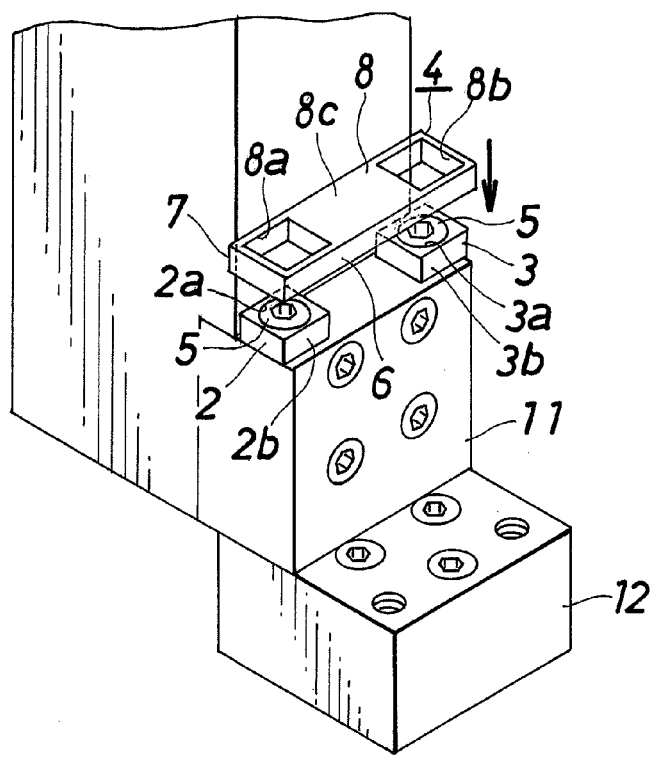
FIG. 2 is a perspective view showing the first embodiment of the bolt-locking apparatus of the invention and showing an intermediate state when the apparatus is mounted.
Figure 3:
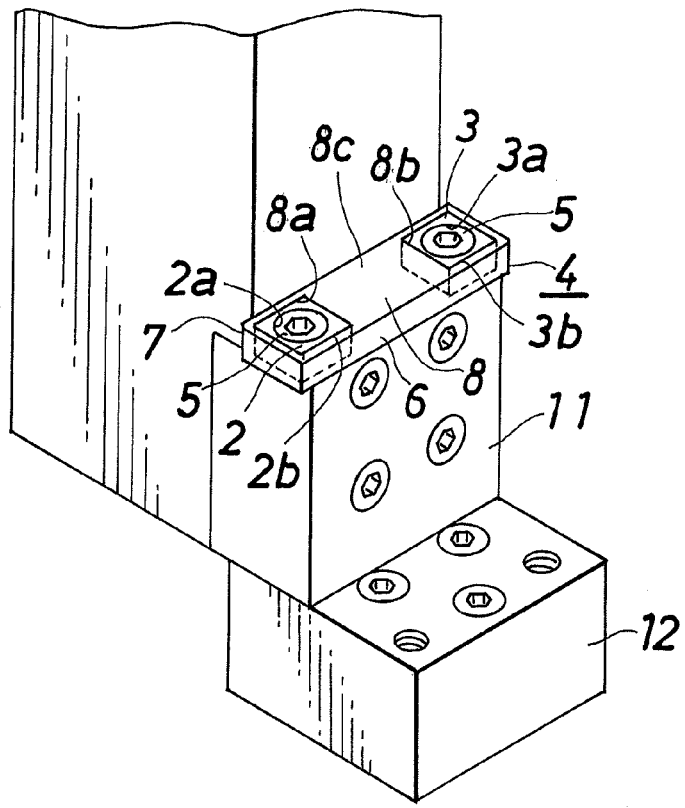
FIG. 3 is a perspective view showing the first embodiment of the bolt-locking apparatus of the invention and showing a state when the apparatus is mounted.
Figure 4:
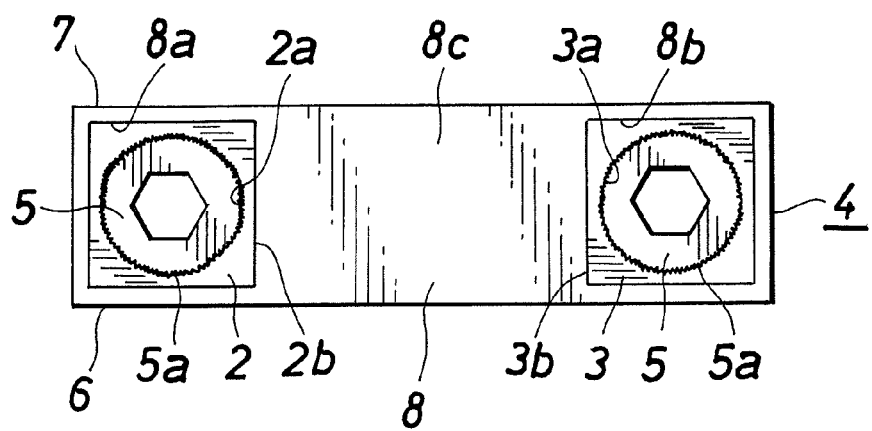
FIG. 4 is a plan view of a state where the bolt-locking apparatus of the invention is mounted.

In FIG. 4, plays between the fitting members (2) and (3) and the engaging holes (8a) and (8b) are substantially zero, but even if there are slight play between the fitting members (2) and (3) and the engaging holes (8a) and (8b), an effect for preventing the fitting members (2) and (3) from rotating by the engaging member (4) is not substantially deteriorated and therefore, the effect for preventing the bolts (5) from loosening is not deteriorated. Therefore, if plays are increased in size, it is possible to facilitate the fitting operation of the engaging member (4) to the fitting members (2) and (3).

The engaging portions of the fitting members (2) and (3) and the engaging holes (8a) and (8b) are square holes (8a) and (8b), and all of four surfaces of the peripheral surfaces thereof abut against each other (all of the four surfaces have functions as engaging surfaces), but since it is only necessary that at least one of the surfaces has the function as the engaging surface, the engaging portions are not limited to the holes (8a) and (8b).

Figure 5:
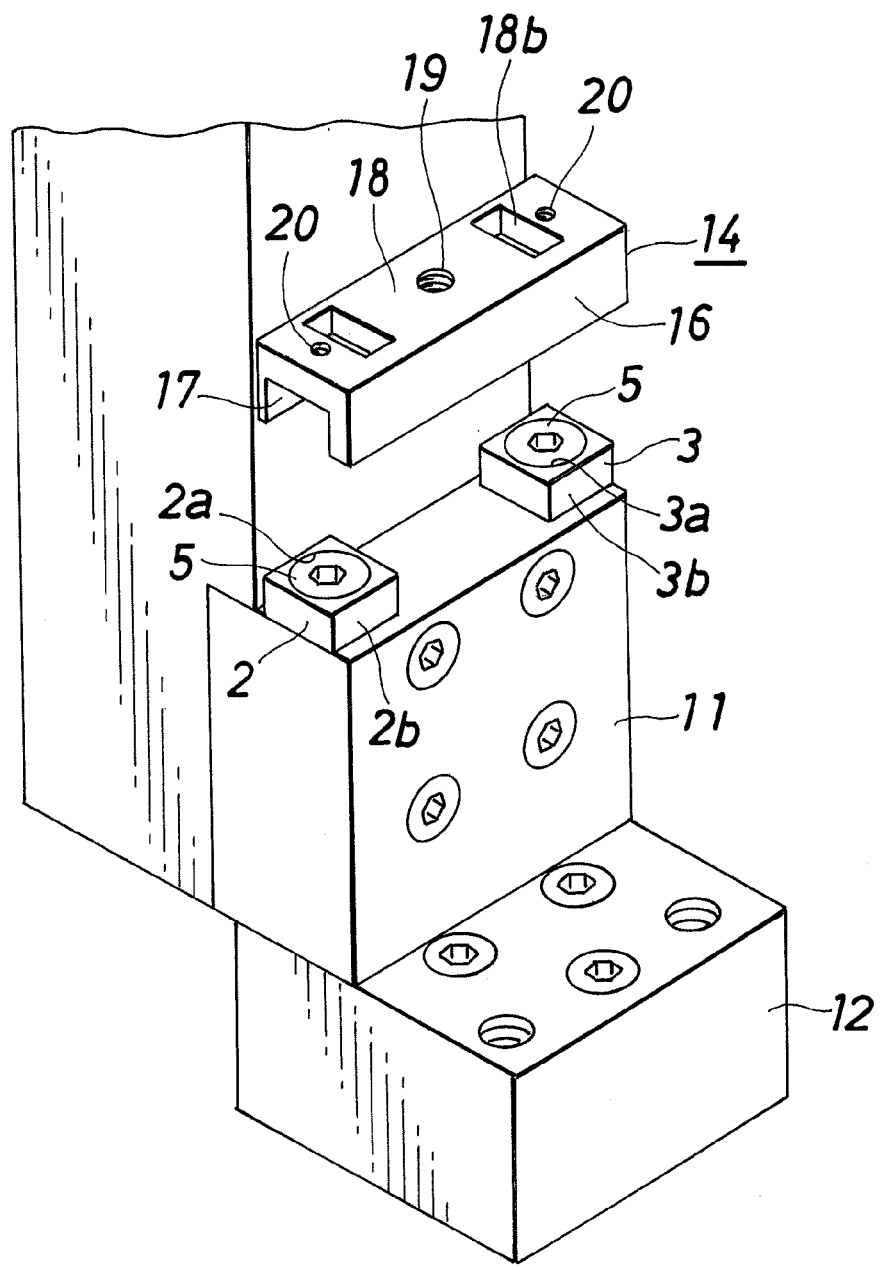
FIG. 5 is a perspective view showing a second embodiment of the bolt-locking apparatus of the invention and showing an intermediate state when the apparatus is mounted.
Figure 6:
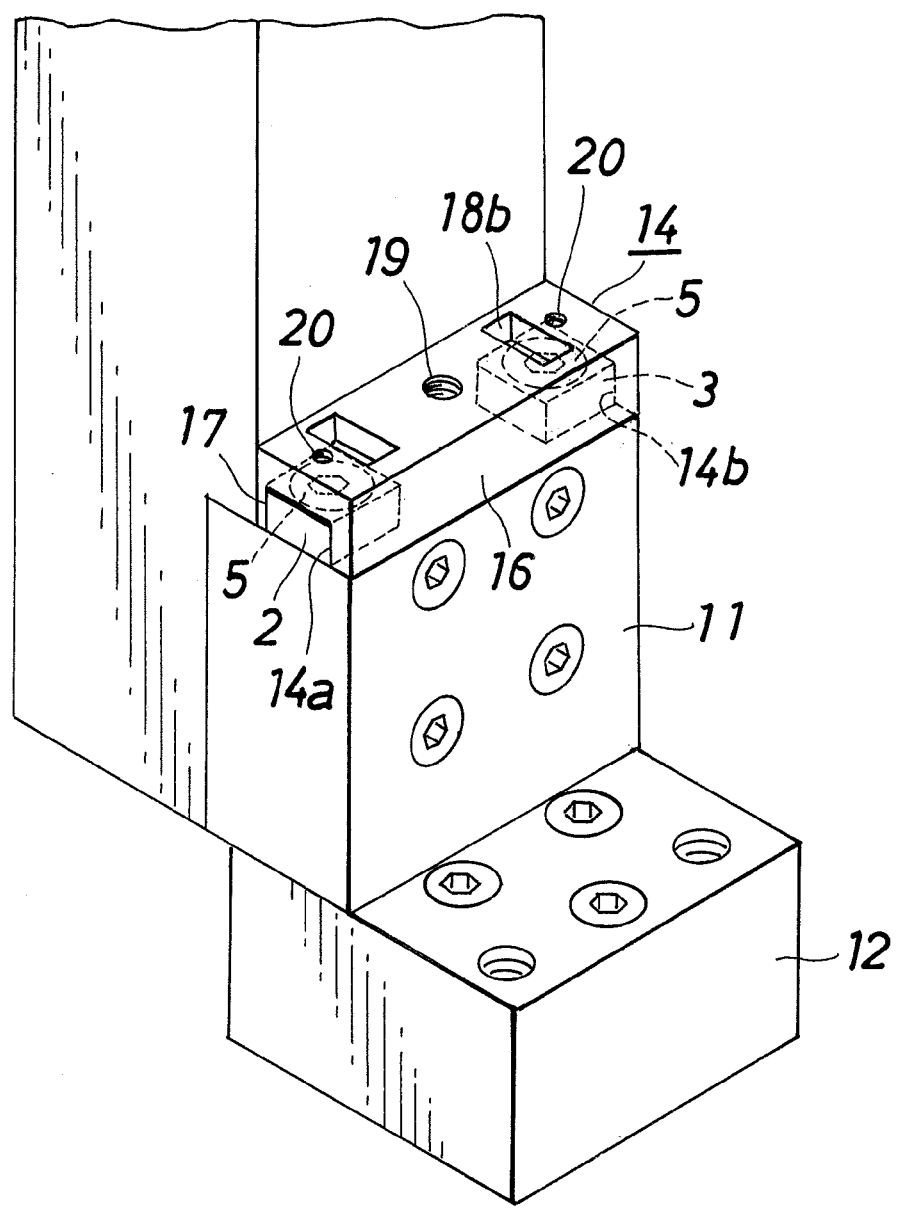
FIG. 6 is a perspective view showing the second embodiment of the bolt-locking apparatus of the invention and showing a state where the apparatus is mounted.

FIGS. 5 to 7 show an embodiment of another engaging member in which the fitting members (2) and (3) have the same shapes as those of the previous embodiment.

In these drawings, an engaging member (14) includes a first opposed wall (16) which is opposed to outer peripheral surfaces of the pair of left and right fitting members (2) and (3) from their front sides (one sides), a second opposed wall (17) which is opposed to outer peripheral surfaces of the pair of fitting members (2) and (3) from their rear sides (other sides), and a connection wall (18) which connects both the opposed walls (16) and (17) with each other.

A lower surface of the connection wall (18) is received by upper surfaces of the fitting members (2) and (3), and windows (18b) through which states of the bolts (5) are checked are provided in the connection wall (18).

As shown in FIG. 7, a square columnar-shaped downward projection (18a) which is fitted in between both the fitting members (2) and (3) is formed on an intermediate portion of the lower surface (inner surface) of the connection wall (18) which is not received by the upper surfaces of the fitting members (2) and (3). According to this, in this embodiment, a first engaging portion (14a) is formed by left portions of both the opposed walls (16) and (17) and a left surface of a downward projection (18a). The first engaging portion (14a) engages with at least a portion of a non-circular outer peripheral surface of the left fitting member (2) to prevent the fitting member (2) from moving. A second engaging portion (14b) is formed by right portions of both the opposed walls (16) and (17) and a right surface of the downward projection (18a). The second engaging portion (14b) engages with at least a portion of a non-circular outer peripheral surface of the right fitting member (3) to prevent the fitting member (3) from moving.

According to the engaging member (14) of this embodiment, it is easy to fit the fitting members (2) and (3) as compared with the engaging member (4) whose engaging portions are the square holes (8a) and (8b), and since the connection wall (18) is formed thick, a strength thereof is enhanced and it is less prone to warp.

In the integration fluid control apparatus (FIG. 18) as one example for which the bolt-locking apparatus of the invention is used, when passage blocks (49a) and (49b) disposed on both sides of the mass flow controller (49) are fixed to a lower V-shaped passage block joint (55) through a pair of bolts (57) for example, since there is almost no operation spaces in front, back, left and right sides of the passage blocks (49a) and (49b), it is necessary to mount the fitting members (2), (3), (4) and (14) by operation from above.

Spaces into which a hand can be inserted do not exist in front, back, left and right sides of the passage blocks (49a) and (49b). Therefore, when the fitting members (2), (3), (4) and (14) are mounted, it is preferable to use two kinds of jigs including a first mounting jig (21) shown in FIGS. 8 and 9, a second mounting jig (31) of the first embodiment shown in FIGS. 10 and 11, or a second mounting jig (32) of the second embodiment shown in FIGS. 14 to 16.

To make it possible to use the second mounting jigs (31) and (32), screw holes (19) and (20) are provided in an intermediate portion and both ends of the engaging member (14) as shown in FIGS. 5 to 7.

Figure 9:
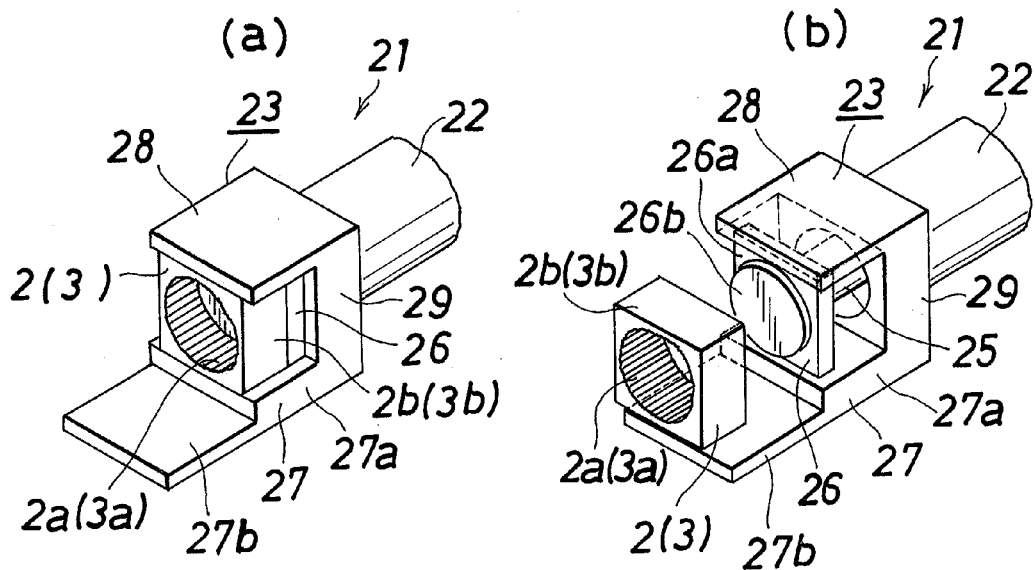
FIG. 9 is enlarged perspective views showing essential portions of the first mounting jig.

As shown in FIGS. 8 and 9, the first mounting jig (21) of the first embodiment includes a hollow shaft (22) which is integrally provided at its tip end with a holding portion (23). The holding portion (23) holds outer peripheral surfaces (2b) and (3b) of the fitting members (2) and (3). The first mounting jig (21) also includes a grip (24) integrally provided on a base end of the hollow shaft (22), and an inner shaft (25) which is integrally provided at its tip end with a pushing portion (26). The pushing portion (26) abuts against upper surfaces of the fitting members (2) and (3). The inner shaft (25) is inserted in the hollow shaft (22) such that the inner shaft (25) can move in the axial direction. A base end of the inner shaft (25) projects from the hollow shaft (22).

As shown in FIG. 9 at a magnification, the holding portion (23) is formed into a substantially U-shape by front and rear walls (27) and (28) and a top wall (29). The holding portion (23) holds the fitting member (2), (3) between the front and rear walls (27) and (28) by friction force. The front wall (27) includes an opposed portion (27a) which is opposed to the rear wall (28) to sandwich the outer peripheral surface (2b), (3b) of the fitting member (2), (3), and a downward projection (27b) which is connected to a lower portion of the opposed portion (27a). An outer surface of the downward projection (27b) is flush with the opposed portion (27a). An inner surface of the downward projection (27b) is concaved more than an inner surface of the opposed portion (27a) so that the inner surface of the downward projection (27b) is guided to a front surface of the connection block (11) which is a to-be fixed member when the first mounting jig (21) which holds the fitting member (2), (3) is moved to a mounting position (position where the fitting member (2), (3) are mounted on the bolts (5)).

As shown in FIG. 9(b) at a magnification, the pushing portion (26) includes a plate-shaped square portion (26a), and a plate-shaped circular portion (26b) provided on a lower surface of the square portion (26a). The circular portion (26b) has such a size that the circular portion (26b) is loosely fitted into the inner peripheral surface (2a), (3a) of the fitting member (2), (3). An outer peripheral edge of the square portion (26a) has a shape extending along an outer peripheral edge of the fitting member (2), (3).

Since the pushing portion (26) and the inner shaft (25) are integrally formed together, if the inner shaft (25) is moved with respect to the hollow shaft (22), the pushing portion (26) can move. The pushing portion (26) is moved to a position where the fitting member (2), (3) is sandwiched between front and rear walls (27) and (28) of the holding portion (23) and abuts against the top wall (29) of the holding portion (23) as shown in FIG. 9(a), and to a position where the pushing portion (26) is separated from the top wall (29) of the holding portion (23) to move downward (toward an opening between front wall (27) and rear wall (28)), thereby separating the fitting member (2), (3) from the holding portion (23) as shown in FIG. 9(b).

Figure 10:
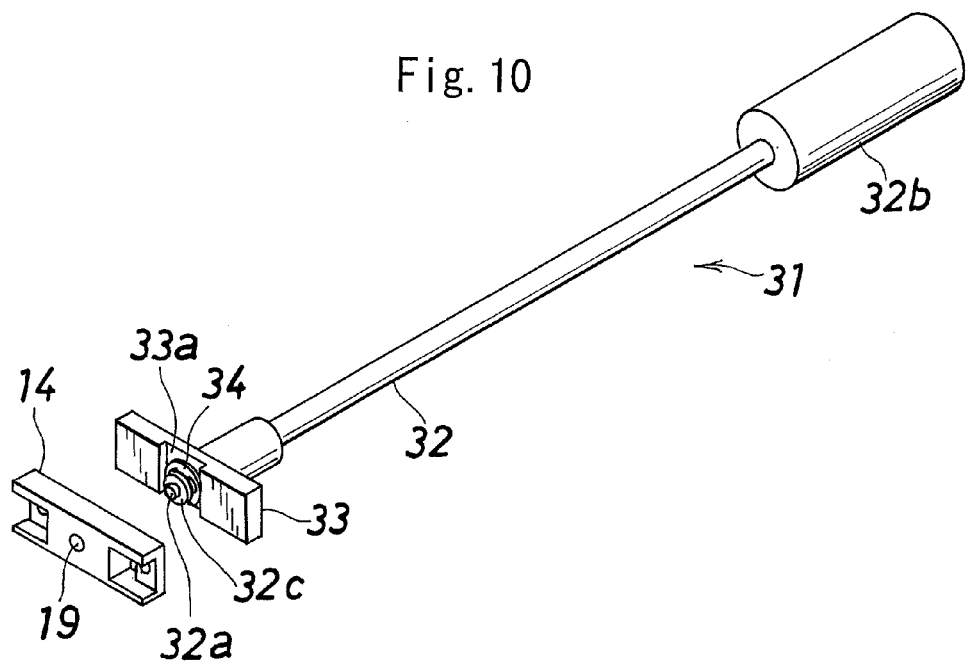
FIG. 10 is a perspective view showing a first embodiment of a second mounting jig of the invention.
Figure 11:
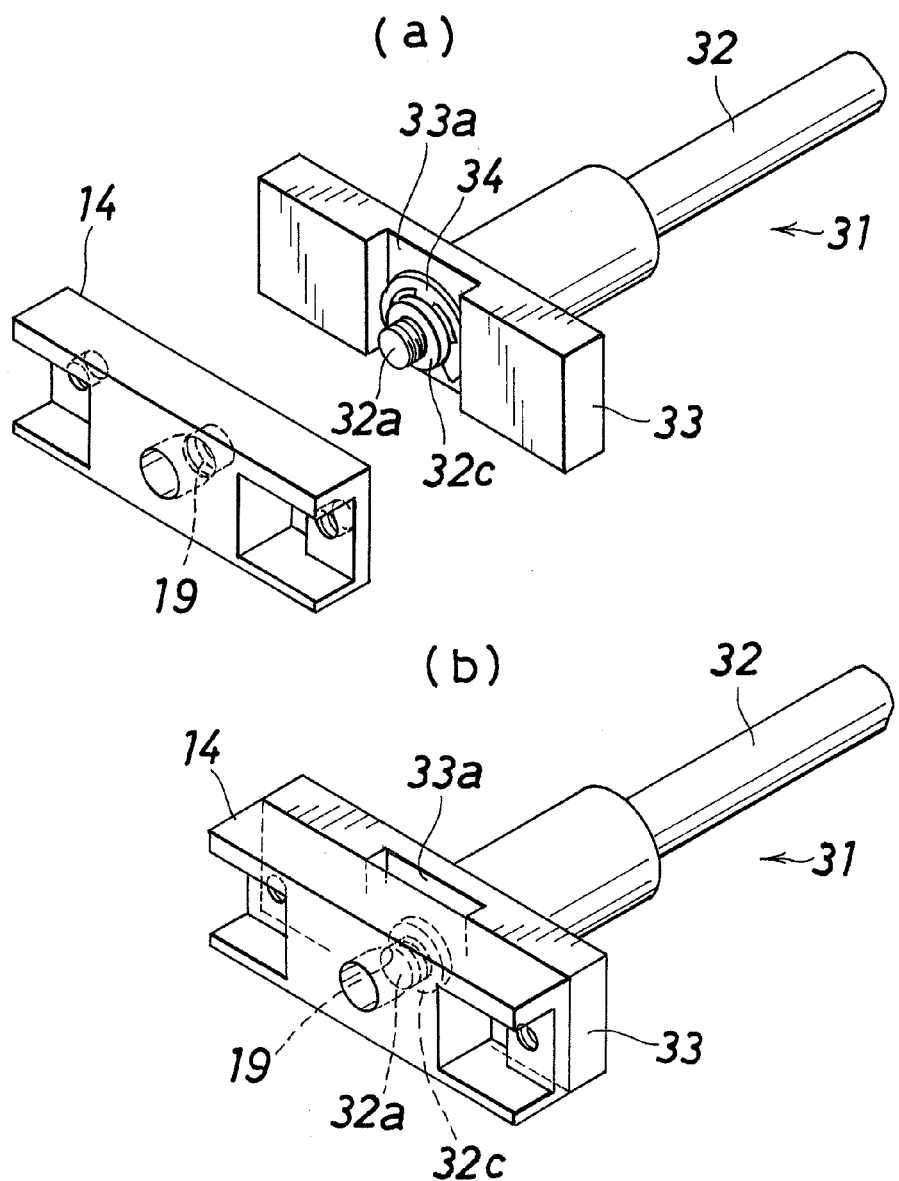
FIG. 11 is enlarged perspective views showing essential portions of the second mounting jig of the first embodiment.

As shown in FIGS. 10 and 11, the second mounting jig (31) includes a shaft body (32) and a reinforcing plate (33). The shaft body (32) is provided at its tip end with a male thread (32a) which is threadedly engaged with a screw hole (19) provided in a central portion of the engaging member (14). The reinforcing plate (33) abuts against an upper surface of the engaging member (14).

A grip (32b) is integrally provided on an upper portion (base end) of the shaft body (32). A flange (32c) which reinforces the male thread (32a) is provided on a portion of a lower end (tip end) of the shaft body (32) located higher than the male thread (32a).

A concave portion (33a) is provided in a central portion of a lower surface of the reinforcing plate (33). The male thread (32a) of the shaft body (32) projects from a bottom surface of the concave portion (33a) of the reinforcing plate (33), and the shaft body (32) is relatively rotatably mounted on the reinforcing plate (33) through an E-ring (34).

A tip end of the male thread (32a) is located at a position where the tip end does not project more than a lower surface of the reinforcing plate (33) before the engaging member (14) is mounted and when the mounting operation of the engaging member (14) is completed. To hold the engaging member (14) by the second mounting jig (31) (FIG. 11(b)), the engaging member (14) is opposed to the second mounting jig (31) as shown in FIG. 11(a), the upper surface of the engaging member (14) is abutted against the lower surface of the reinforcing plate (33) and in this state, the shaft body (32) is rotated and the male thread (32a) is threadedly engaged with the screw hole (19) of the engaging member (14).

The fitting member (2) is mounted on the bolt (5) using the first mounting jig (21) as shown in FIGS. 12(a) to (d).

Figure 12:
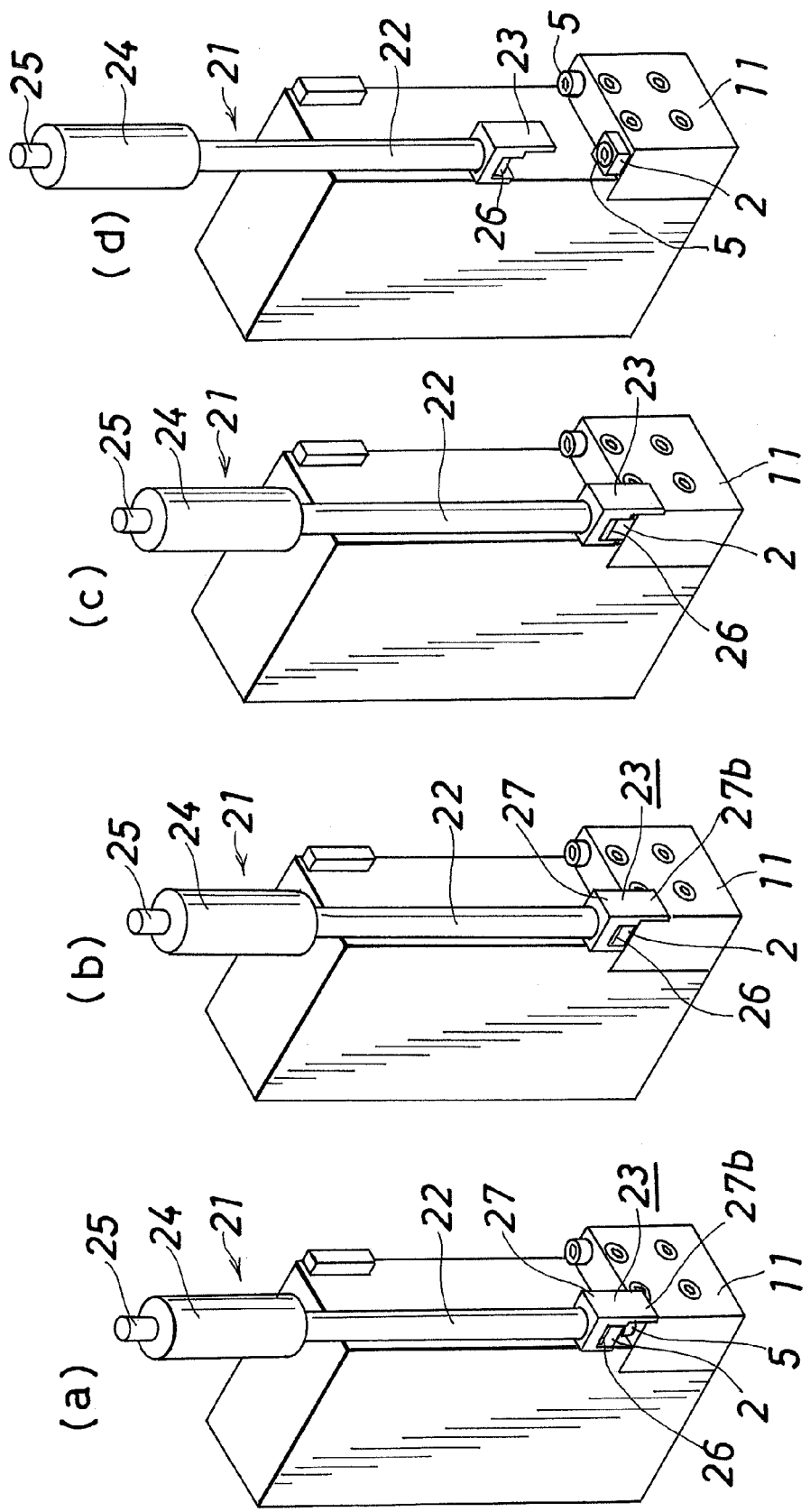
FIG. 12 is perspective views showing a method for mounting the bolt-locking apparatus of the invention using the first mounting jig.

The grip (24) of the first mounting jig (21) having the fitting member (2) sandwiched between the front and rear walls (27) and (28) of the holding portion (23) is held, the fitting member (2) is inserted into a space above the connection block (11), and the fitting member (2) is abutted against the bolt (5) such that the downward projection (27b) of the front wall (27) of the holding portion (23) is located along a front surface of the connection block (11) (FIG. 12(a)). The first mounting jig (21) is pushed downward while finely adjusting such that a head of the bolt (5) and the fitting member (2) are fitted to each other (FIG. 12(b)). Next, by pushing the inner shaft (25) downward, the hollow shaft (22) is upwardly moved relatively (FIG. 12(c)). According to this, the fitting member (2) is pushed by the pushing portion (26) and separated from the holding portion (23) and mounted on the bolt (5). Then, the first mounting jig (21) is moved upward and this mounting operation is completed (FIG. 12(d)).

The fitting member (3) is mounted on the right bolt (5) using the first mounting jig (21) in the same manner.

The fitting member (2), (3) is mounted on the bolt (5) using the first mounting jig (21) as described above. According to this, as a space when the fitting member (2), (3) is mounted, even if there are no sufficient spaces around the bolt (5) (front, back, left and right sides) although there is a space above the bolt (5), it is possible to reliably fit the fitting member (2), (3) to the bolt (5). The fitting member (2), (3) is pushed by the pushing portion (26) and is separated from the holding portion (23). According to this, it is possible to avoid a problem that the fitting member (2), (3) is not easily come out from the first mounting jig (21) after the fitting member (2), (3) is fitted to the bolt (5).

Figure 13:
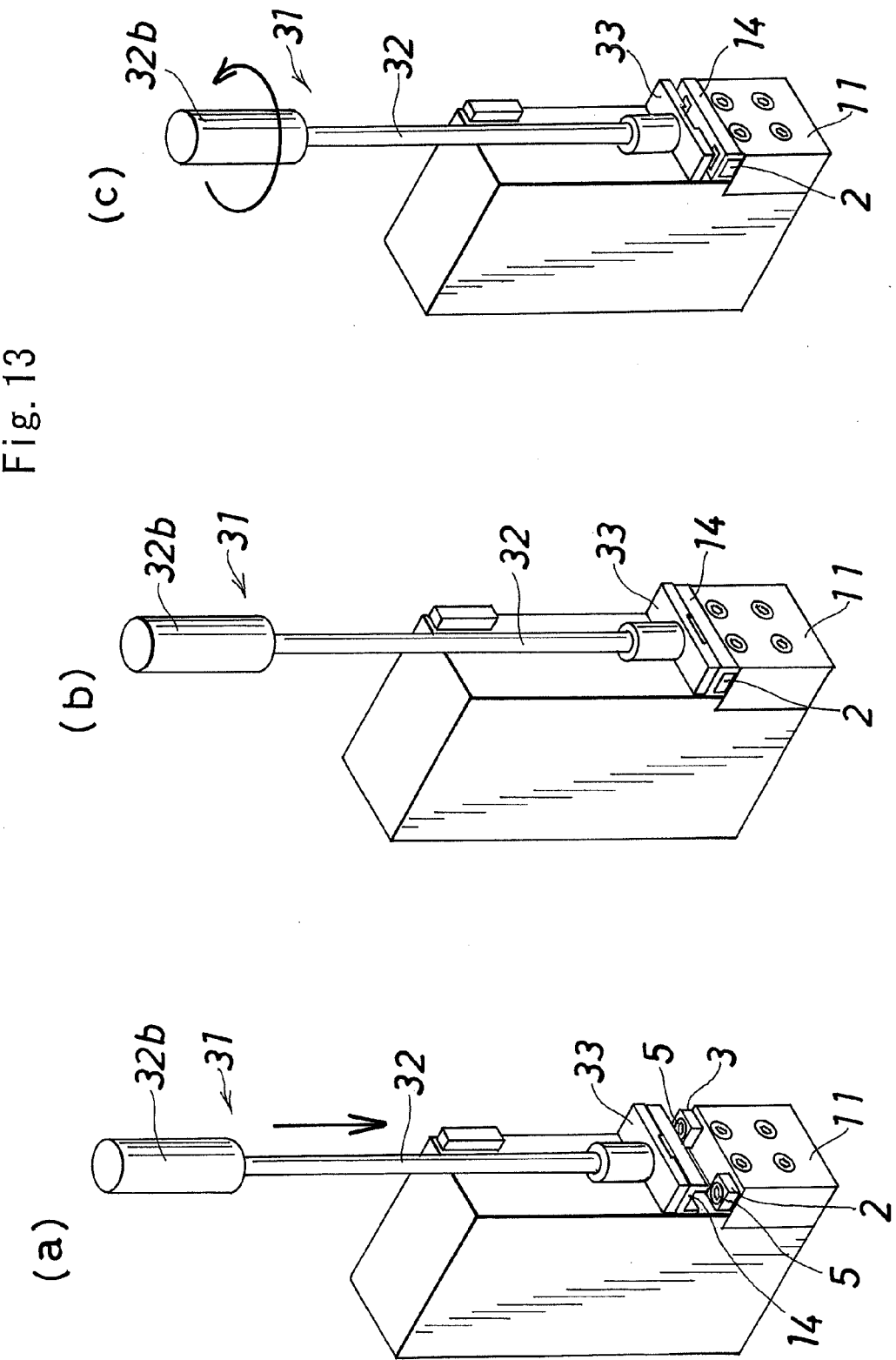
FIG. 13 is perspective views showing a method for mounting the bolt-locking apparatus of the invention using the second mounting jig of the first embodiment.

The engaging member (14) is mounted on the fitting members (2) and (3) using the second mounting jig (31) as shown in FIG. 13.

The engaging member (14) is threadedly engaged with the second mounting jig (31), the grip (32b) is held, the second mounting jig (31) is inserted into a space above the connection block (11) and is moved downward (FIG. 13(a)). Then, the second mounting jig (31) is pushed downward while finely adjusting such that the engaging member (14) and the pair of fitting members (2) and (3) are fitted to each other (FIG. 13(b)). Next, the shaft body (32) is rotated in a direction where the thread engagement is released to disengage the shaft body (32) (FIG. 13(c)). According to this, the second mounting jig (31) and the engaging member (14) are separated from each other. Only the second mounting jig (31) is moved upward and this mounting operation is completed.

The engaging member (14) is mounted on the fitting members (2) and (3) using the second mounting jig (31) in the above-described manner. According to this, as a space when the engaging member (14) is mounted, even if there are no sufficient spaces around the bolt (5) and the fitting member (2) and (3) (front, back, left and right sides) although there are spaces above the bolt (5) and the fitting member (2) and (3), it is possible to reliably fit the engaging member (14) to the fitting members (2) and (3). Since the reinforcing plate (33) is provided on the second mounting jig (31), if the reinforcing plate (33) is abutted against the engaging member (14), a warp of the engaging member (14) can be straightened, and the engaging member (14) can smoothly be fitted when the engaging member (14) is mounted on the pair of engaging members (2) and (3).

In FIG. 13, a portion which hinders insertion of the second mounting jig (31) does not exist in a space above the connection block (11), but connectors for connecting a communication cable are provided on front and rear surfaces of amass flow controller shown with a symbol (49) in FIG. 18, and the second mounting jig (31) shown in FIGS. 10 and 11 can not be inserted in some cases.

Figure 14:
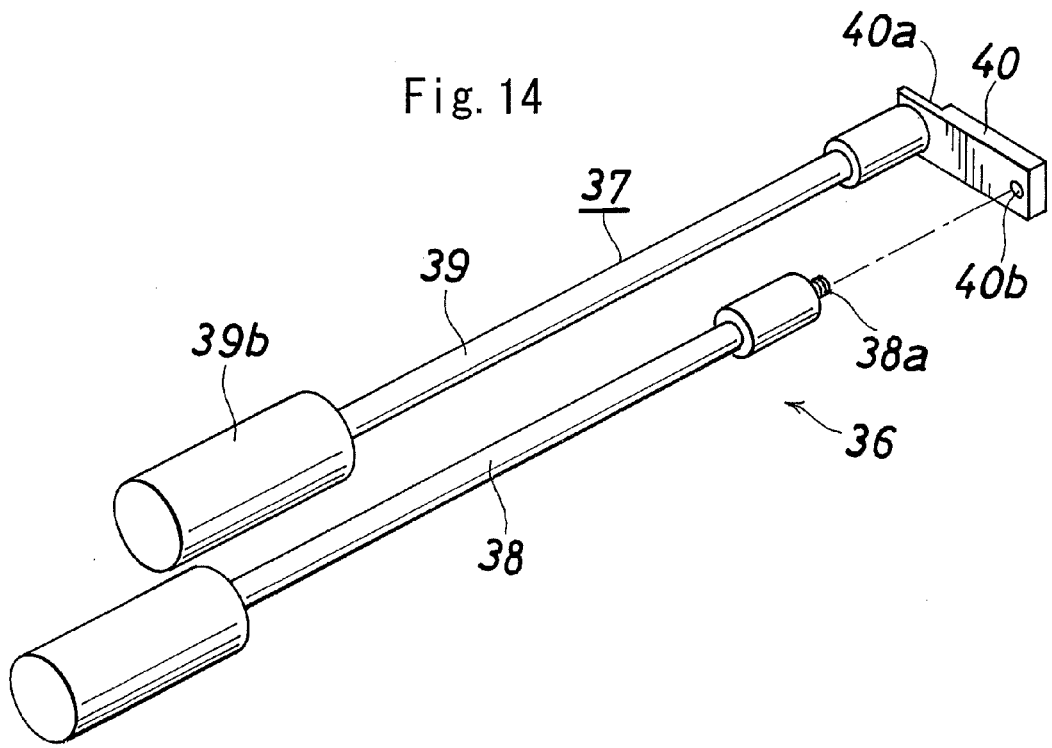
FIG. 14 is a perspective view showing a second embodiment of the second mounting jig of the invention.
Figure 15:
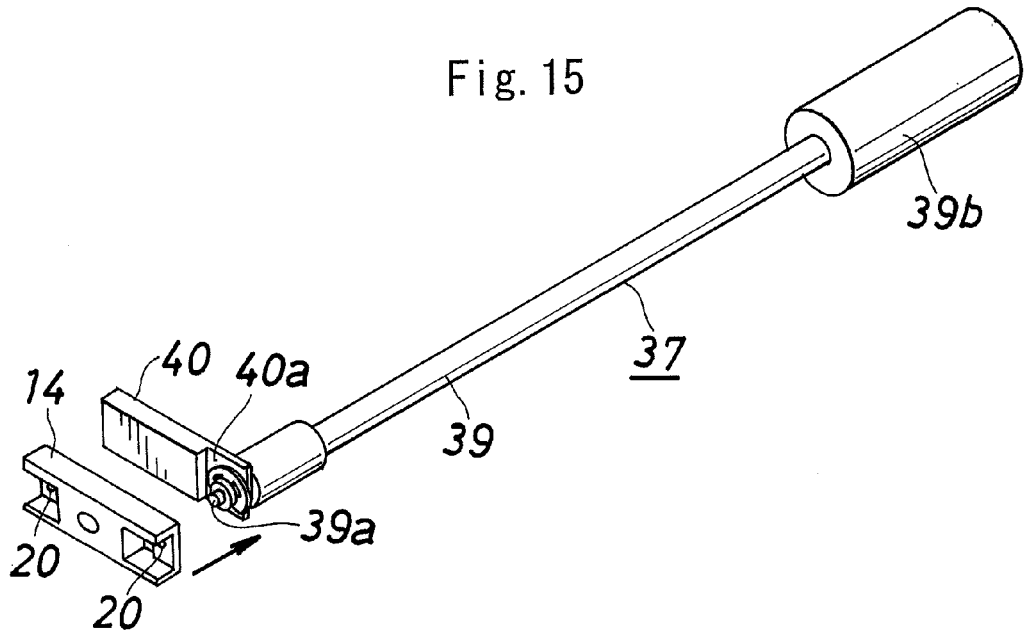
FIG. 15 is an enlarged perspective view showing a shaft body having a reinforcing plate of the second mounting jig of the second embodiment.
Figure 16:
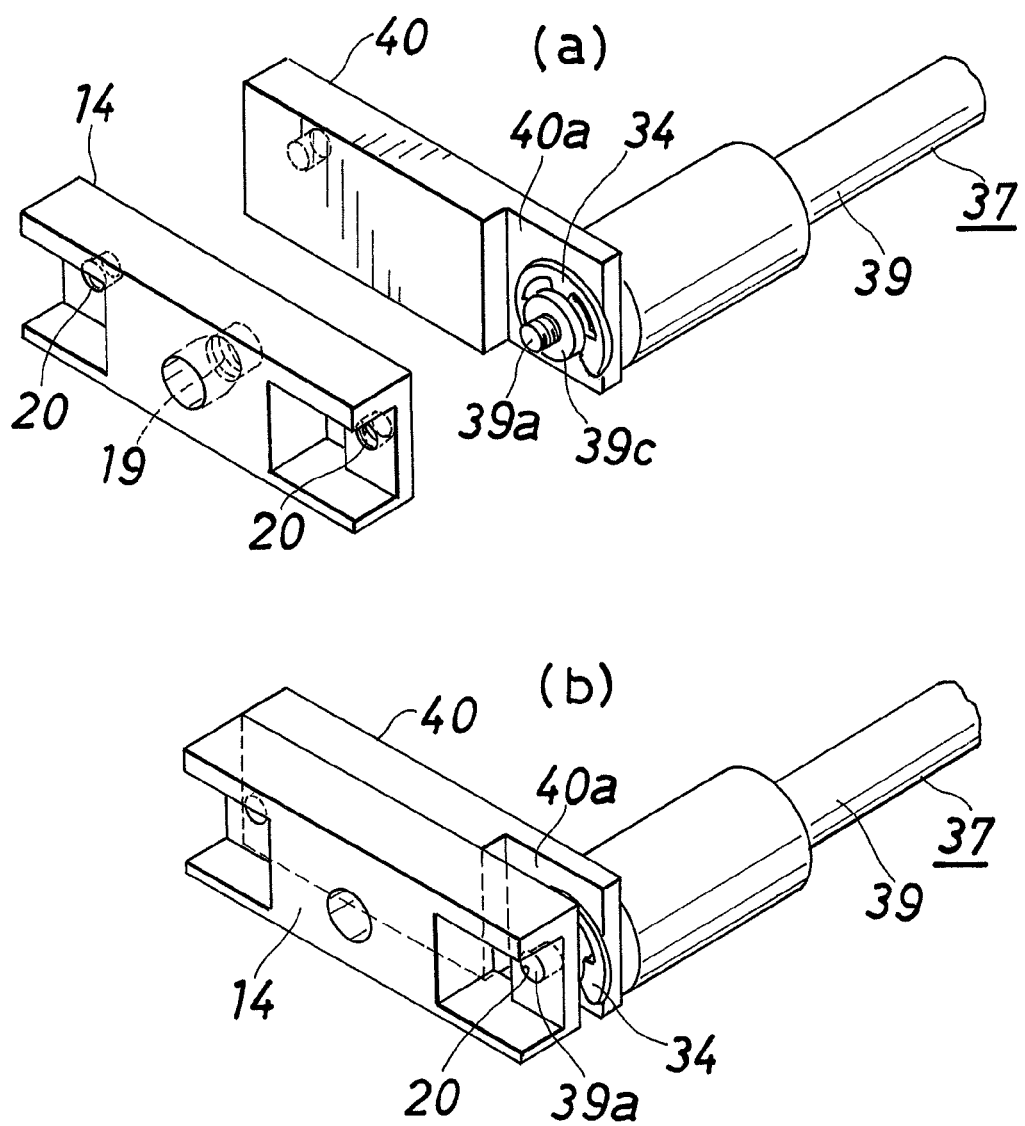
FIG. 16 is enlarged perspective views showing essential portions of the second mounting jig of the second embodiment.

A second mounting jig (36) in a second embodiment shown in FIGS. 14 to 16 is effective when a portion which interferes with upper portions of left and right central portions of the connection block (11) exist. The second mounting jig (36) includes a shaft body (37) having a reinforcing plate and an auxiliary shaft body (38) which is detachably mounted on the shaft body (37) having the reinforcing plate.

The shaft body (37) having the reinforcing plate has a shape similar to the second mounting jig (31) of the first embodiment shown in FIGS. 10 and 11. The shaft body (37) having the reinforcing plate includes a main shaft body (39) which is provided at its tip end with a male thread (39a) and a reinforcing plate (40) which abuts against an upper surface of the engaging member (14), the male thread (39a) being threadedly engaged with a screw hole (20) provided in the engaging member (14). Here, the shaft body (37) having the reinforcing plate is different from the second mounting jig (31) in the first embodiment in that the main shaft body (39) is mounted on an end of the reinforcing plate (40), a concave portion (40a) having a through hole into which the main shaft body (39) is inserted is provided not on a central portion but on an end of the reinforcing plate (40), and a screw hole (40b) is provided in the other end of the reinforcing plate (40). The second mounting jig (31) in the first embodiment has a substantially T-shape as a whole, but the shaft body (37) having the reinforcing plate has a substantially L-shape as a whole.

A male thread (38a) which is threadedly engaged with the screw hole (40b) of the reinforcing plate (40) is provided on a tip end of the auxiliary shaft body (38).

The shaft body (37) having the reinforcing plate is the same as the second mounting jig (31) in the first embodiment except the above-described differences. As shown in FIGS. 14 and 15, a grip (39b) is integrally provided on a base end (upper end) of the main shaft body (39). As shown in FIG. 16, a flange (39c) which reinforces the main shaft body (39) is provided on a portion of a tip end (lower end) of the shaft body (39) located higher than the male thread (39a). The main shaft body (39) is mounted on the reinforcing plate (40) through the E-ring (34) in a state where the male thread (39a) projects from a bottom surface of the concave portion (40a) of the reinforcing plate (40) such that the main shaft body (39) can relatively rotate.

A tip end of the male thread (39a) is located at a position where the tip end does not project more than a lower surface of the reinforcing plate (40) before the engaging member (14) is mounted and when the mounting operation of the engaging member (14) is completed. To hold the engaging member (14) by the shaft body (37) having the reinforcing plate (FIG. 16(b)), the engaging member (14) is opposed to the shaft body (37) having the reinforcing plate as shown in FIG. 16(a), the upper surface of the engaging member (14) is abutted against the lower surface of the reinforcing plate (40) and in this state, the main shaft body (39) is rotated and the male thread (39a) is threadedly engaged with the screw hole (20) of the engaging member (14).

Figure 17:
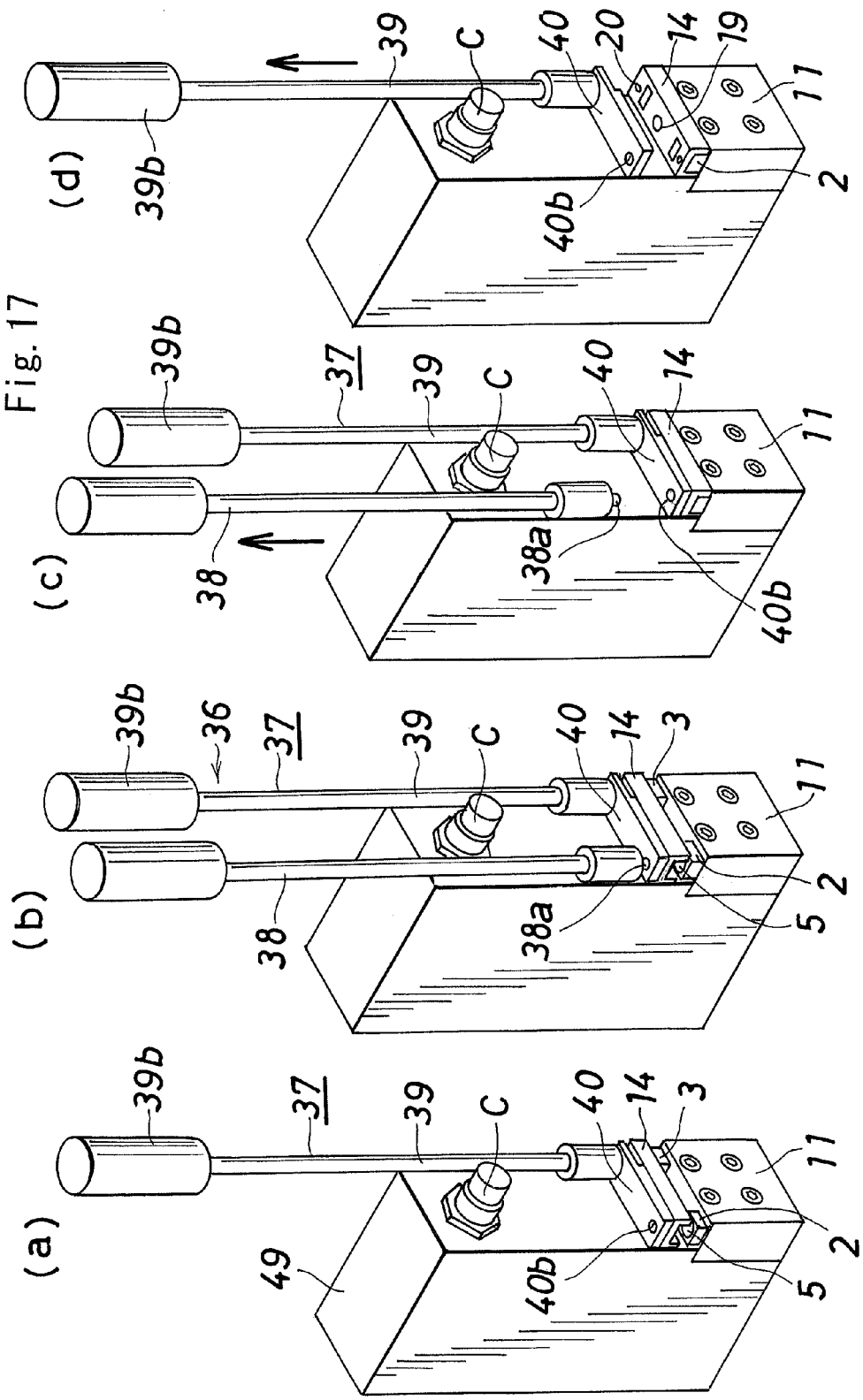
FIG. 17 is perspective views showing a method for mounting the bolt-locking apparatus of the invention using the second mounting jig of the second embodiment.

The engaging member (14) is mounted on the fitting members (2) and (3) using the second mounting jig (36) of the second embodiment as shown in FIG. 17.

The engaging member (14) is threadedly engaged with the shaft body (37) having the reinforcing plate while holding the grip (39b), the engaging member (14) is inserted into a space above the connection block (11) and is moved downward (FIG. 17(a)). At that time, if the reinforcing plate (40) is horizontal, since the mass flow controller (49) interferes with the connector (C) for connecting the communication cable of the mass flow controller (49), the reinforcing plate (40) is inclined to avoid the interference with the connector (C) and then, the reinforcing plate (40) is oriented horizontally. Next, the auxiliary shaft body (38) is threadedly engaged with the reinforcing plate (40), thereby integrally forming the auxiliary shaft body (38) on the shaft body (37) having the reinforcing plate (FIG. 17(b)). Then, the second mounting jig (36) including the shaft body (37) having the reinforcing plate and the auxiliary shaft body (38) is pushed downward while finely adjusting such that the engaging member (14) and the pair of fitting members (2) and (3) are fitted to each other. Thereafter, the auxiliary shaft body (38) is first detached from the shaft body (37) having the reinforcing plate (FIG. 17(c)) and then, the main shaft body (39) is rotated with respect to the reinforcing plate (40), and thread engagement between the main shaft body (39) and the engaging member (14) is released (FIG. 17(d)). According to this, the shaft body (37) having the reinforcing plate and the engaging member (14) are separated from each other, only the shaft body (37) having the reinforcing plate is moved upward and this mounting operation is completed.

The engaging member (14) is mounted on the fitting members (2) and (3) using the second mounting jig (36) of the second embodiment in the above-described manner. According to this, even when a portion (C) which hinders insertion of the second mounting jig (31) of the first embodiment exists above the connection block (11), it is possible to mount the engaging member (14) while avoiding the interference.

A plurality of lines each having a configuration which is similar to that of the line (41) shown in FIG. 18 are disposed on the main substrate (42) in parallel, and interrupter switches (48) of the lines (41) are connected to each other through the passage connecting means (56), thereby forming the integration fluid control apparatus. According to the integration fluid control apparatus, a plurality of kinds of gas can be controlled and supplied. In a substrate processing apparatus including a processing container in which a substrate to be processed is accommodated, and a processed gas supply portion which supplies processed gas into the processing container, the integration fluid control apparatus is suitably used as a fluid control apparatus provided in the processed gas supply portion.

The invention claimed is:

1. A bolt-locking apparatus after a to-be fixed member is fixed using a plurality of bolts, comprising:
a plurality of fitting members which are relatively non-rotatably fitted to heads of the plurality of bolts; and
an engaging member which is mounted on the plurality of fitting members such that the engaging member straddles the fitting members, the engaging member being engaged with the fitting members,
wherein each of the bolts is a hexagonal socket-head bolt whose head peripheral surface is straightly knurled, the head of each of the hexagonal socket-head bolts projects from a to-be fixed member and penetrates the to-be fixed member, an outer peripheral surface of each of the fitting members is square in shape, an inner peripheral surface of the fitting member is knurled, the fitting member is fitted to the head of each of the hexagonal socket-head bolts which is exposed from the to-be fixed member, and the engaging member fitted to the plurality of fitting members such that the engaging member straddles the fitting members is received by the to-be fixed member.

2. The bolt-locking apparatus according to claim 1, wherein the engaging member includes a first opposed wall which is opposed to outer peripheral surfaces of the plurality of fitting members from one side, a second opposed wall which is parallel to the first opposed wall and opposed to the outer peripheral surfaces of the plurality of fitting members from the other side, and a connection wall which connects both the opposed walls to each other.

3. The bolt-locking apparatus according to claim 2, wherein each of the engaging portions of the engaging member is an engaging hole which includes a non-circular inner peripheral surface corresponding to the non-circular outer peripheral surface of the fitting member, and which is provided in the connection wall.

4. The bolt-locking apparatus according to claim 2, wherein the connection wall of the engaging member includes a projection, the projection being fitted in between adjacent fitting members, thereby forming the engaging portion together with the first opposed wall and the second opposed wall.

5. The bolt-locking apparatus according to claim 1, wherein the engaging member is rectangular plate-shaped, wherein outer peripheral surfaces of the fitting members are square in shape, and inner peripheral surfaces of engaging holes of the engaging member are square in shape.

6. The bolt-locking apparatus according to claim 1, wherein a lower surface of a connection wall of the engaging member is received by upper surfaces of the fitting members, and windows, through which states of the bolts are checked, are provided in the connection wall.

7. The bolt-locking apparatus according to claim 6, wherein the number of the plurality of fitting members is a pair of left and right, wherein a square columnar-shaped downward projection which is fitted in between both the fitting members is formed on an intermediate portion of the lower surface of the connection wall which is not received by the upper surfaces of the fitting members, and
a first engaging portion is formed by left portions of both opposed walls of the engaging member and a left surface of a downward projection and the first engaging portion engages with at least a portion of a non-circular outer peripheral surface of the left fitting member to prevent the fitting member from moving, and a second engaging portion is formed by right portions of both the opposed walls and a right surface of the downward projection and the second engaging portion engages with at least a portion of a non-circular outer peripheral surface of the right fitting member to prevent the fitting member from moving.

\* \* \* \* \*